(12) United States Patent
Dickie et al.

(10) Patent No.: US 6,337,541 B1
(45) Date of Patent: Jan. 8, 2002

(54) ELECTROLUMINESCENT LIGHTING DEVICE

(76) Inventors: Robert G. Dickie, 15 Valley Trail, Newmarket, Ontario; T. Kirkwood Tierney, 5056 2$^{nd}$ Line, New Tecumseth, Ontario; David J. Van Tuyl, 79 Holland River Blvd., Holland Landing, Ontario, all of (CA)

( * ) Notice: Subject to any disclaimer, the term of this patent is extended or adjusted under 35 U.S.C. 154(b) by 0 days.

(21) Appl. No.: 09/414,947

(22) Filed: Oct. 8, 1999

(51) Int. Cl.$^7$ ................................................ G09G 3/10
(52) U.S. Cl. ........................ 315/169.3; 315/DIG. 4
(58) Field of Search .......................... 315/169.3, 200 R, 315/246, 291, DIG. 4, 149, 158; 439/375, 597, 598, 599

(56) References Cited

U.S. PATENT DOCUMENTS

| | | | |
|---|---|---|---|
| 3,888,583 A | * 6/1975 | Kiefer et al. ................. 355/71 |
| 3,968,355 A | 7/1976 | Smallegan ................... 240/2 R |
| 4,135,116 A | 1/1979 | Smith .......................... 315/158 |
| 4,182,977 A | 1/1980 | Stricklin, Jr. ............... 315/158 |
| 4,467,246 A | 8/1984 | Tanaka et al. ............. 315/158 |
| 4,593,234 A | 6/1986 | Yang ........................... 315/362 |
| 4,792,729 A | * 12/1988 | Peters ..................... 315/200 R |
| 4,886,961 A | 12/1989 | Kimura et al. ............. 250/205 |
| 5,083,946 A | * 1/1992 | Chester, Jr. ................. 439/692 |
| 5,089,748 A | 2/1992 | Ihms ........................... 315/151 |
| 5,336,978 A | 8/1994 | Alessio ....................... 315/169.3 |
| 5,357,170 A | * 10/1994 | Luchaco et al. ............ 315/158 |
| 5,361,017 A | 11/1994 | Krause ........................ 315/151 |
| 5,406,173 A | 4/1995 | Mix et al. ................... 315/156 |
| 5,446,343 A | 8/1995 | Shulman ..................... 315/156 |
| 5,493,183 A | 2/1996 | Kimball ...................... 315/308 |
| 5,537,003 A | 7/1996 | Bechtel et al. ............... 315/82 |
| 5,572,817 A | 11/1996 | Chien .......................... 40/544 |
| 5,670,776 A | 9/1997 | Rothbaum ............ 250/214 AL |
| 5,779,346 A | 7/1998 | Burke ......................... 362/84 |
| 5,888,090 A | * 3/1999 | Achee ......................... 439/417 |
| 5,975,938 A | * 11/1999 | Libby ......................... 439/410 |

FOREIGN PATENT DOCUMENTS

| | | |
|---|---|---|
| EP | 0 470 866 | 2/1992 |
| WO | WO 99/40559 | 8/1999 |

* cited by examiner

Primary Examiner—Don Wong
Assistant Examiner—Thuy Vinh Tran
(74) Attorney, Agent, or Firm—Sterne, Kessler, Goldstein & Fox P.L.L.C.

(57) ABSTRACT

A supplementary lighting device with a replaceable electroluminescent light element is disclosed. A control system is provided to boost the light intensity of the electroluminescent light element. A light sensor is provided which detects light emitted from the electroluminescent lighting element and inputs this information to the control system. The control system automatically adjusts the intensity of the electroluminescent lighting element according to a pre-set value and the information from the light sensor. This allows for the electroluminescent lighting element to maintain a constant output despite the ageing of the electroluminescent lighting element. The pre-set value for the intensity of the electroluminescent lighting element can be adjusted by a user controlled dimmer. The dimmer varies the amount of light detected by the light sensor in order to increase or decrease the power provided by the control system to the electroluminescent lighting element.

15 Claims, 10 Drawing Sheets

ELECTROLUMINESCENT LIGHTING DEVICE

BACKGROUND OF THE INVENTION

1. Field of the Invention

The present invention relates to supplementary lighting devices utilizing an electroluminescent lighting element and a control system. In particular, the present invention relates to an electronic and mechanical control system coupled to an electroluminescent lighting element in order to provide user-adjustable light intensity, automatic output compensation, and an automatic daytime shutoff feature.

2. Related Art

Supplementary lighting devices, such as night lights, are well known and commonly used for security and safety purposes. For example, supplementary lighting devices can be used to illuminate passageways and stairways to assist night travel or escape in an emergency. They are also commonly used to relieve night anxiety in children, decrease the probability of burglary, and may provide accent lighting.

Several different types of lighting elements can be used in supplementary lighting devices. For example, incandescent bulbs, fluorescent bulbs, neon-type gas discharge elements, and electroluminescent (EL) elements are possible lighting elements for supplementary lighting devices. When choosing a lighting element for a supplementary lighting device, several factors such as cost, safety, longevity, and illumination are generally taken into consideration.

Incandescent lighting elements offer low initial cost and are easily replaceable. Incandescent lighting elements also offer relatively bright light, which is preferable in security type applications. This bright light, however, is not desirable in night light type applications. Further, incandescent lights burn at very high temperatures. In a supplementary lighting type application, the bulbs are generally small such that the glass enclosure is close to the element. These supplementary lighting devices are generally located near the ground, within easy reach of small children. Therefore, incandescent lights create a safety risk to children. The point source emission of an incandescent light is less preferable than wide area emissions.

Neon type lighting elements could also be used in supplementary lighting devices. Neon lights are low cost. However, they are generally not user-replaceable, therefore the entire device must be discarded when the lighting element fails. Neon light elements, however, can last several years, although they initially have a precipitous rate of decline of output. Hence, the light they emit for most of their life is only a small fraction of their initial output. Neon lights are also generally dim. Neon lights are cool, thereby presenting less of a safety hazard than incandescent lights.

Fluorescent lighting elements are also used in supplementary lighting devices. Fluorescent lighting elements have a high initial cost, but can generally be replaced. However, because fluorescent lighting elements are generally difficult to find, supplementary lighting devices using them are generally throw-away type units. Fluorescent lighting elements produce a wide range of colors, and are generally very bright, without being a point source emission. Fluorescent lights are also generally cool, reducing the safety risk associated with hot lighting elements. Fluorescent lighting elements have a relatively long life span, but toward the end of their useful life, they often experience flickering of the lighting element.

Recently, electroluminescent (EL) lighting elements have become increasingly popular for use in supplementary lighting devices. EL lighting elements provide wide-area emission, are cool (i.e., will not burn to the touch), and have a very long life. Most EL lighting elements used in supplementary lighting devices are connected directly across the 110 volt, AC power from a common household outlet. However, these EL lighting elements have the disadvantage that they are generally dim, are not replaceable, and their intensity fades gradually over their life span. Additionally, EL lighting elements utilized in supplementary lighting devices also generally remain activated even during the day, when their relatively dim light is not required.

There exist well-known techniques for increasing the light intensity of EL lighting elements above that which is generated by connecting them across 110 AC power lines. Methods for increasing the output of EL lighting elements include altering the voltage, altering the oscillation frequency of the alternating electricity, varying the duty cycle, and/or varying the waveform. However, these methods for increasing the output EL lighting elements still suffer from some of the same drawbacks as conventional EL lighting elements. For example, power boosted EL lighting elements still suffer illumination declines over the life of the light. Further, the amount of light cannot be controlled for specific applications.

Supplementary lighting devices, regardless of the lighting element utilized, can also present a safety hazard to children due to their connection to a wall socket. These supplementary lighting devices are generally inserted into wall sockets located near the floor, within easy reach of small children. Children tend to play with the rear of the lighting device, where it is connected to the wall socket. Children can potentially burn themselves if they touch the blades of the supplementary lighting device while it is still connected to the wall socket.

SUMMARY OF THE INVENTION

As can be seen from the description above, there exists a need for a supplementary lighting device which includes the advantages of EL lighting elements while accounting for the disadvantages of such systems.

The present invention addresses these disadvantages by providing a supplementary lighting device with a user-adjustable dimmer that works in conjunction with a control system to vary the intensity of an EL lighting element.

The dimmer, preferably mechanically or optically, adjusts the amount of light detected by a light sensor from the EL lighting element. Therefore, by adjusting the dimmer, the amount of light actually detected by the light sensor is artificially varied, and the information from the light sensor is inputted into the control system, which then adjusts the amount of power provided to the EL lighting element in a closed loop feedback system. This arrangement simultaneously allows the control system to adjust for ageing of the EL lighting element.

Furthermore, the light sensor, or an additional one, may simultaneously detect ambient light, and depending on the amount of ambient light detected, the control system can completely shut off the EL lighting element. This provides a "daytime off" feature which conserves the EL lighting element and improves longevity of the device.

The EL lighting element is also replaceable. The device is designed such that a guide-way aligns the EL lighting element into mechanical and electrical contact with the control system. The guide-way is the only path from the user-accessible area of the device to the control system electronics. In addition, the device may be designed such that the EL lighting element is not accessible until the device is disconnected from a power source. In particular, the window covering the EL lighting element is coupled to the housing of the supplementary lighting device via a fastener which cannot be uncoupled without first disconnecting the device from the power source. This allows for safe replacement of the EL lighting element.

Another feature of the present invention is a safety device to prevent electrocution on electrical connection blades of the device while the device is still connected to a power source. In particular, a protector covers the electrical connection blades when the blades are removed from a power source. The protector retracts as the connection blades are inserted into a power source, and extends to cover the connection blades as the connection blades are removed from the power source.

BRIEF DESCRIPTION OF THE FIGURES

The present invention is described with reference to the accompanying drawings, wherein.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention.

Figure 1:
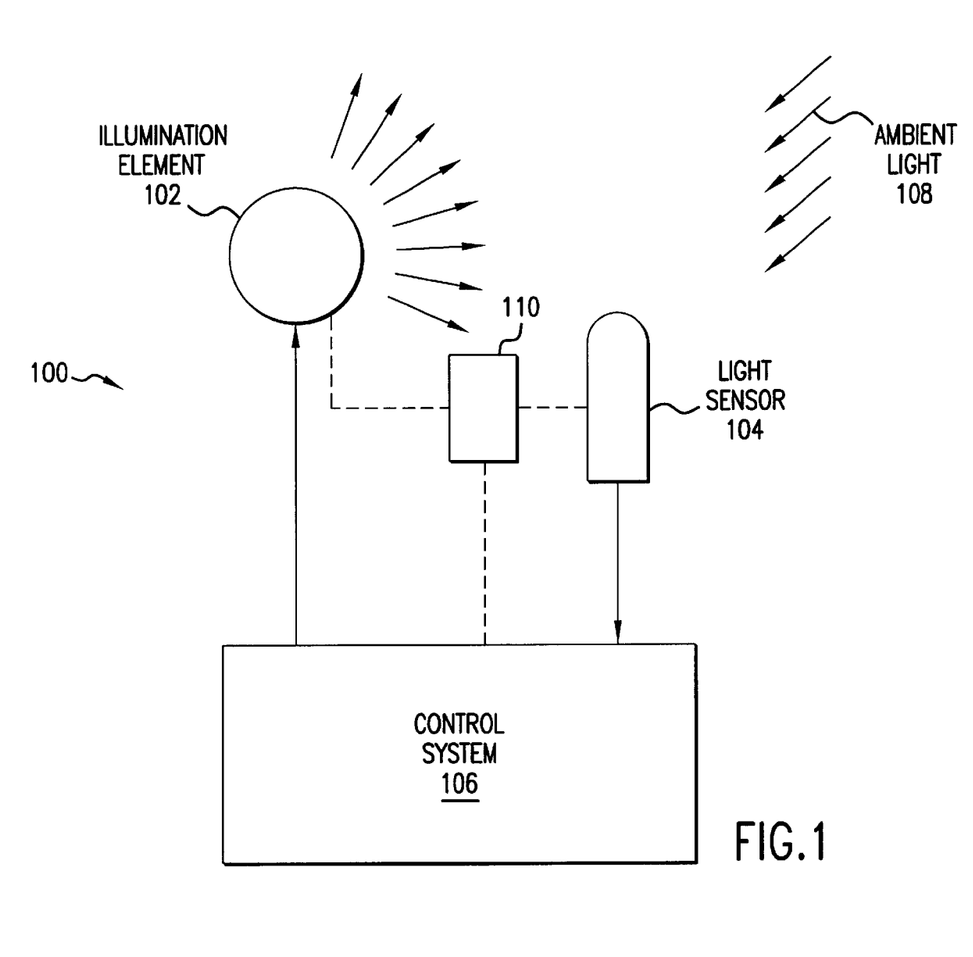
FIG. 1 is a functional block diagram of a supplementary lighting device of the present invention.

A preferred embodiment of a supplementary lighting device 100 is shown in block form in FIG. 1. FIG. 1 shows that device 100 includes an illumination element 102, light sensor 104, a control system 106 and a dimmer 110. Light sensor 104 and illumination element 102 are both coupled to control system 106. Control system 106 is preferably an electronic system which receives input from light sensor 104 and controls illumination element 102. Dimmer 110 is user controlled and varies the output intensity of illumination element 102 working in conjunction with light sensor 104, illumination element 102 and/or control system 106, as will be more fully explained below.

Illumination element 102 is an electroluminescent (EL) lighting element which will be described in more detail below. Light sensor 104 is preferably a light detecting resistor (LDR) and is disposed in device 100 so as to receive input both from illumination element 102 and any ambient light 108. Light sensor 104 can also be configured as two light sensors, one for detecting light emitted from illumination element 102 and one for detecting ambient light 108. Light sensor 104 can also be a photo-diode, photo-resistor, photo-transistor, or other similar devices which can detect light intensity.

Control system 106 is designed to generate an adjustable intensity of brightness of illumination element 102. A preferred method of generating an adjustable intensity of brightness uses a combination of an astable oscillating circuit and a voltage multiplying circuit. The frequency of the oscillator is controlled by a pre-set signal as well as input received from light sensor 104. In the example where light sensor 104 is an LDR, the resistance of the LDR is a function of the amount of light it receives. As the light intensity of ambient light 108 or illumination element 102 increases, the resistance of the LDR increases, thereby slowing the oscillator of control system 106. As the oscillator slows, the intensity of illumination element 102 decreases. As would be apparent to one skilled in the relevant art, depending on the pre-set levels of control system 106, illumination element 102 can be controlled such that when ambient light 108 is detected by light sensor 104 which is consistent with daylight or artificially lighted conditions, the oscillator is slowed such that illumination element 102 is turned "off."

It can be appreciated that because light sensor 104 also receives light emitting from illumination element 102, control system 106 acts as an intensity regulator to compensate for the decreased output of EL lighting elements due to aging. Therefore, with a pre-set intensity for illumination element 102, as illumination element ages and its light intensity diminishes, light sensor 104 detects less light emitting from illumination element 102. This information is transmitted to control system 106, which increases the power to illumination element 102. This provides an automatic intensity regulation feature which compensates for the effects of ageing in illumination element 102.

Figure 2:
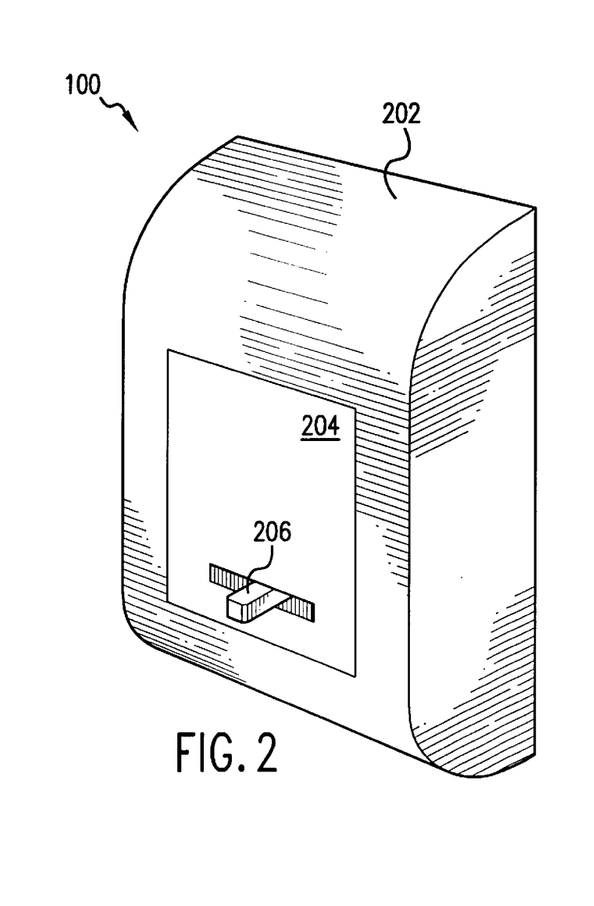
FIG. 2 is an isometric view of a supplementary lighting device of the present invention.
Figure 3A:
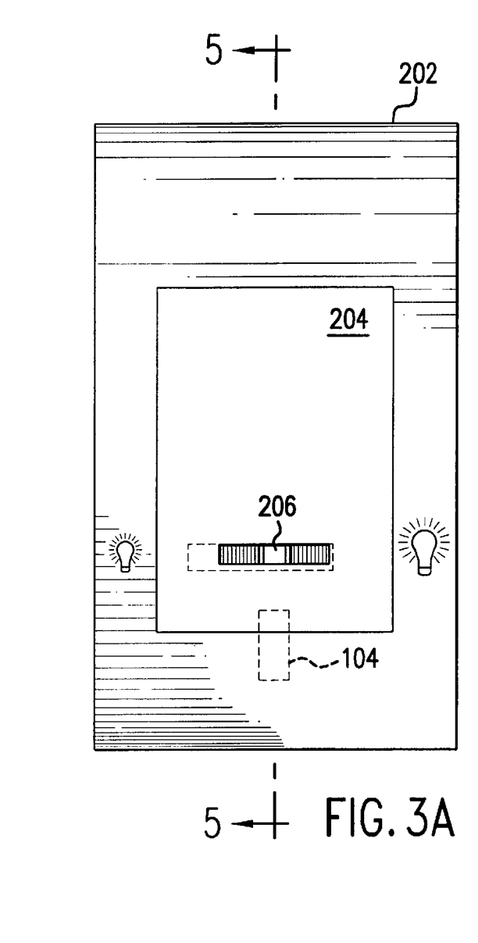
FIG. 3A is a front elevation view of a supplementary lighting device of the present invention.
Figure 3B:
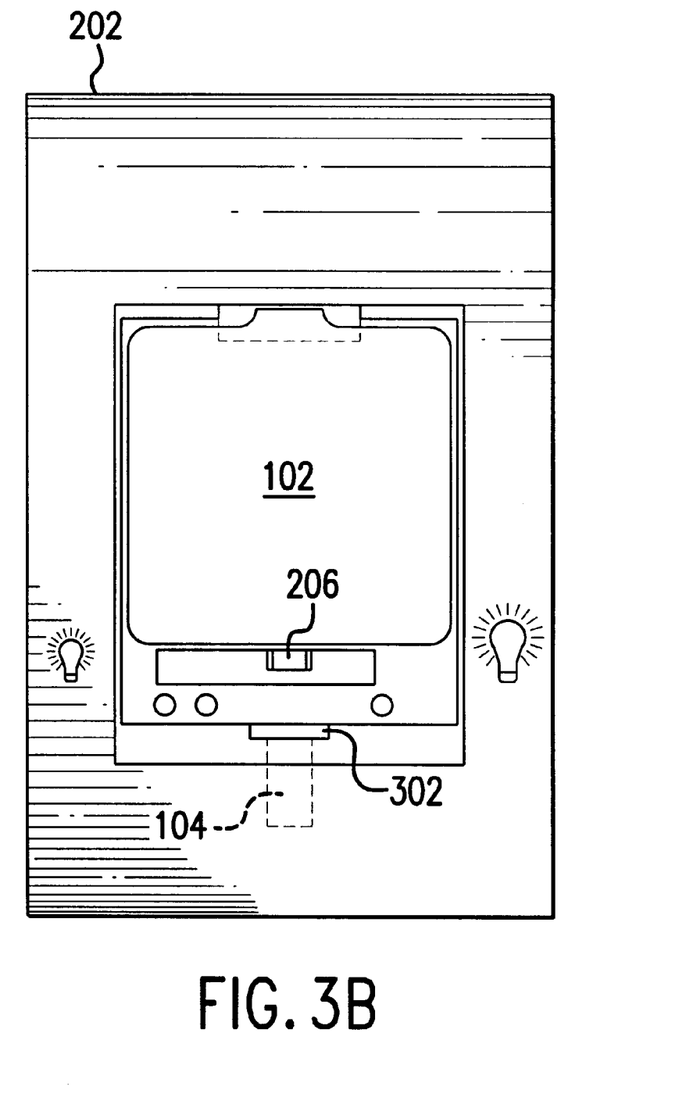
FIG. 3B is a front elevation view of a supplementary lighting device of the present invention with the window removed.

FIG. 2 shows a preferred embodiment of supplementary lighting device 100. Device 100 includes a housing 202, a window 204, and a dimmer control 206. Dimmer control 206 allows the user to vary the pre-set intensity of illumination element 102. Dimmer control 206 can allow the user to select in a variety of ways, as will be more fully described below. FIG. 3A shows a front elevation view of device 100, showing housing 202, window 204, and dimmer control 206. Light sensor 104 is also shown in phantom. FIG. 3B shows a front elevation of device 100 with window 204 removed. It can be seen that illumination element 102 is located behind window 204. Light sensor 104 can also been seen in FIG. 3B. Further, aperture 302 is located near light sensor 104 to allow detection of ambient light 108.

Figure 4:
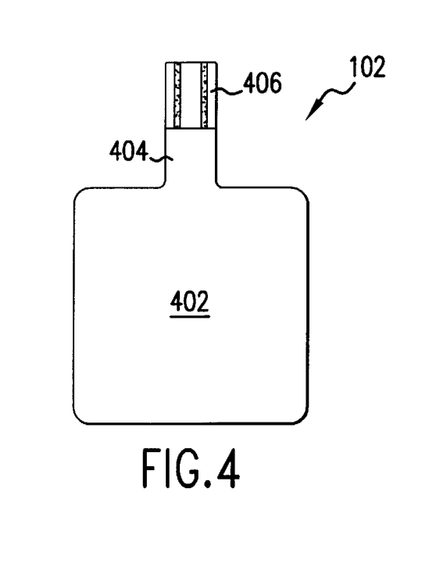
FIG. 4 is an elevation view of an electroluminescent lighting element.

A preferred embodiment of illumination element 102 is shown in FIG. 4. Illumination element 102 includes a substantially planar illumination area 402 and an elongated connection tail 404 extending from illumination area 402. Conductor strips 406 are disposed on connection tail 404. Conductor strips 406 connect to control system 106 to provide power to illumination element 102, as will be explained in more detail below.

Figure 5:
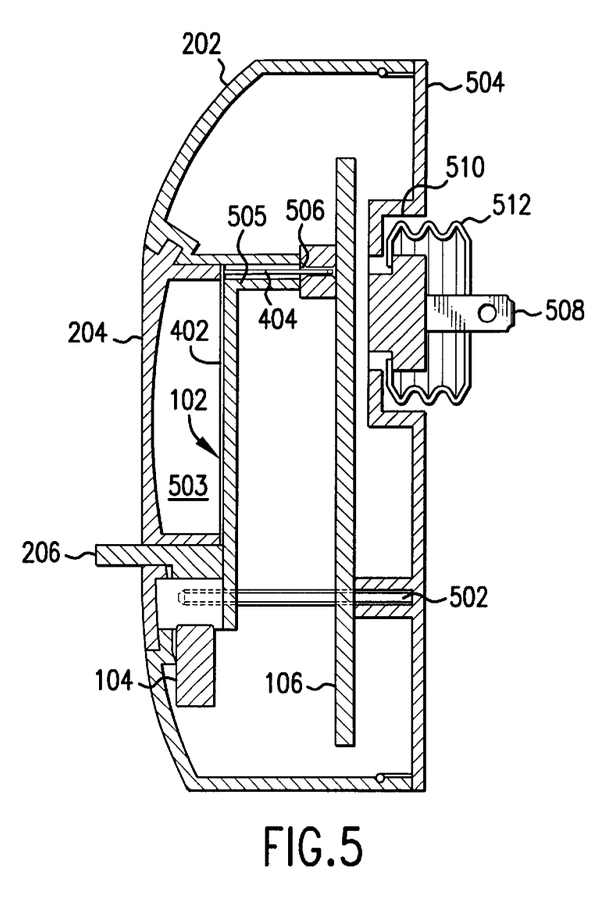
FIG. 5 is a cross-section of the supplementary lighting device of the present invention taken along lines 5—5 of FIG. 3A.

FIG. 5 shows a side cross-section view of device 100, taken along line 5—5 of FIG. 3A. As can be seen, housing 202 and window 204 serve as an enclosure for device 100. Window 204 is preferably coupled to housing 202 by a fastener 502 located at a rear surface 504 of housing 202. Fastener 502 can be a screw or other similar type of fastening device. Window 204 may also be press fit into housing 202. However, a fastener is a preferred attachment device. In particular, it is preferable that the fastener be located at rear surface 504 of housing 202, because it requires removal of device 100 from the power source (wall socket) before window 204 can be removed. This safety precaution prevents one from attempting to replace illumination element 102 while device 100 is connected to the power source.

Window 204 preferably press fits illumination area 402 of illumination element 102 against a flat interior cavity 503 of housing 202. Elongated tail 404 of illumination element 102 fits into a guide-way 505. Guide-way 505 leads to connector 506 which connects to control system 106. When elongated tail 404 is inserted through guide-way 505 and into connector 506, conductor strips 406 make contact with connector 506, such that control system 106 provides power to illumination element 102. Guide-way 505 is the only path from the user-accessible area behind window 204 to control system 106.

Also shown in FIG. 5 is an additional safety feature to prevent minor electrical shocks or burns to small children attracted to supplementary lighting device 100 due to its proximity to the ground and attractive light. Device 100 is normally plugged into a common household wall socket via electrical contact blades 508 which protrude from rear surface 504 of housing 202. In a preferred embodiment of device 100, a recess or cavity 510 is formed in rear surface 504 of housing 202 surrounding electrical contact blades 508. A protector 512 is disposed in cavity 510 and extends the length of blades 508. Protector 512 is collapsible such that it collapses into cavity 510 as blades 508 are inserted into the wall socket. When blades 508 are removed from the wall socket, protector 512 extends from cavity 510 to prevent contact with blades 508 until device 100 is completely removed from the wall socket. Protector 512 therefore prevents fingers, screwdrivers, toys, etc., from contacting blades 508 while blades are still in contact with the electrical power source. Protector 512 is preferably made of nonconductive and resilient material such as rubber, and is preferably constructed in the form of bellows, as shown, for easy expansion and contraction.

Figure 6:
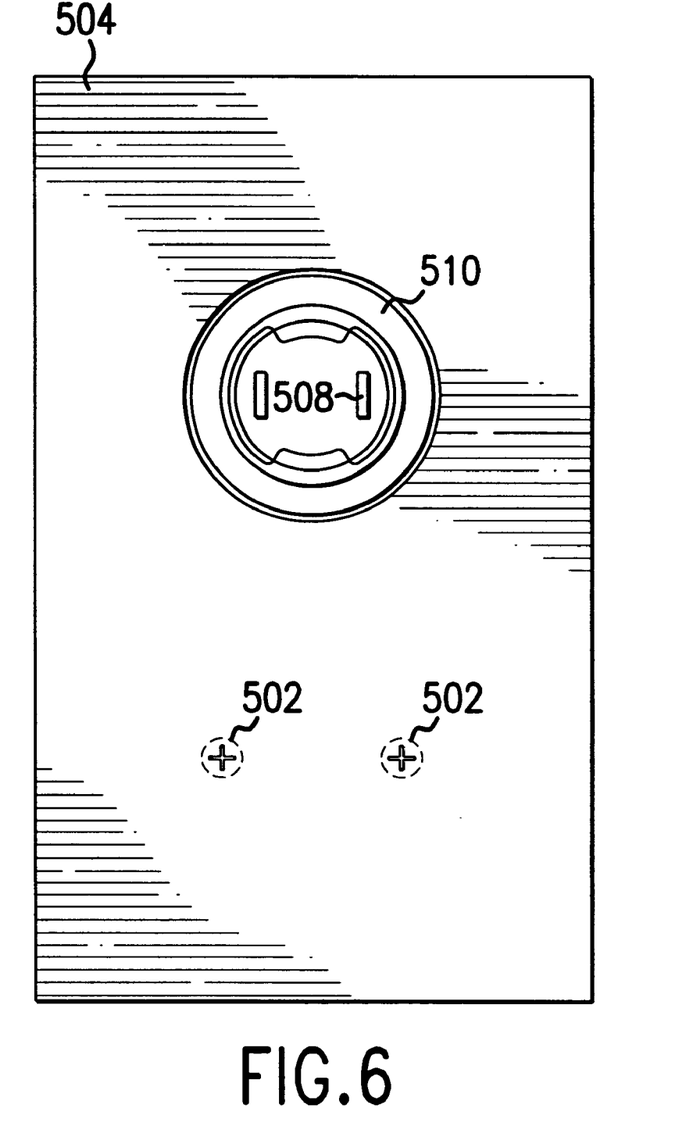
FIG. 6 is a rear elevation view of a supplementary lighting device of the present invention.
Figure 7:
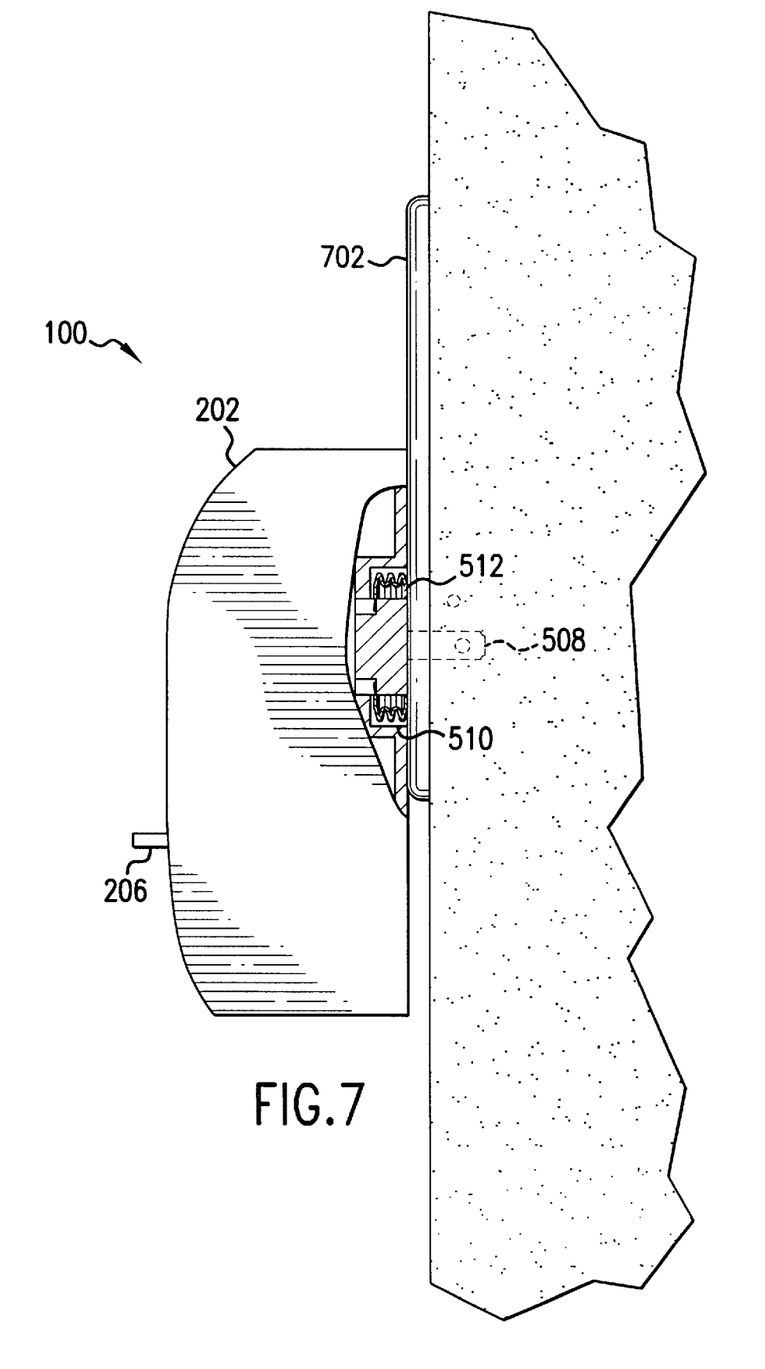
FIG. 7 is a side elevation of a supplementary lighting device of the present invention and a conventional wall socket.

FIG. 6 shows an elevation view of rear surface 504 of device 100, including cavity 510, electrical connection blades 508, and fasteners 502. FIG. 7 shows a side elevation of device 100 coupled to a standard household outlet 702 as a power source.

Explanation will now be provided for various embodiments of dimmer 110. Dimmer 110 can vary the illumination intensity of illumination element 102 by directly acting with control system 106, as shown in FIG. 1. Preferably, however, dimmer 110 works in conjunction with light sensor 104 to mechanically and/or optically adjust the intensity of light output from illumination element 102 which is detected by light sensor 104. As discussed above, the intensity of light outputted from illumination element 102 is increased or decreased by control system 106 depending on the amount of light detected from light sensor 104. Therefore, dimmer 110 is constructed such that the amount of light detected by light sensor 104 can be artificially adjusted by the user.

Figure 8A:
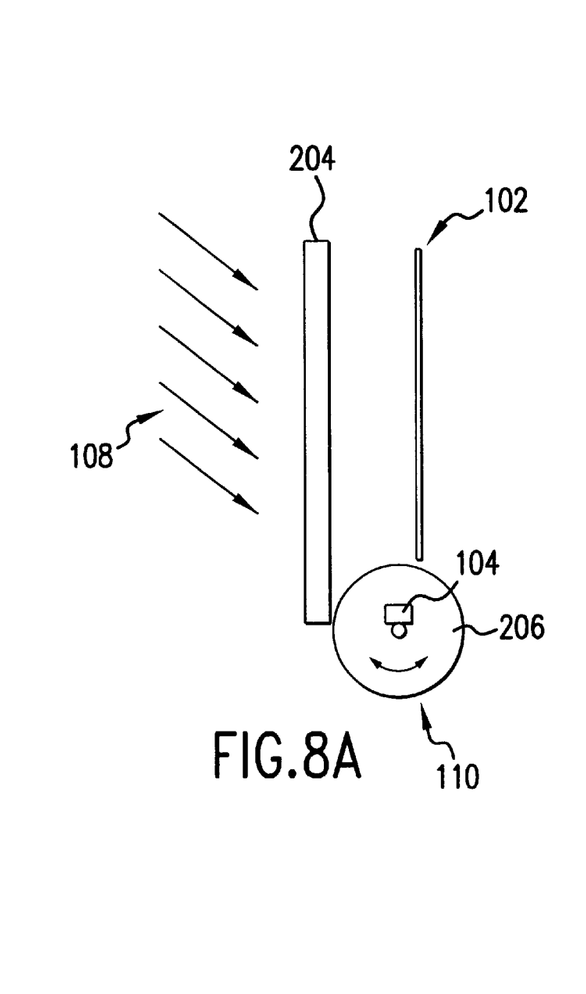
FIGS. 8A and 8B are cross-section views of an embodiment of a dimmer of the present invention.
Figure 8B:
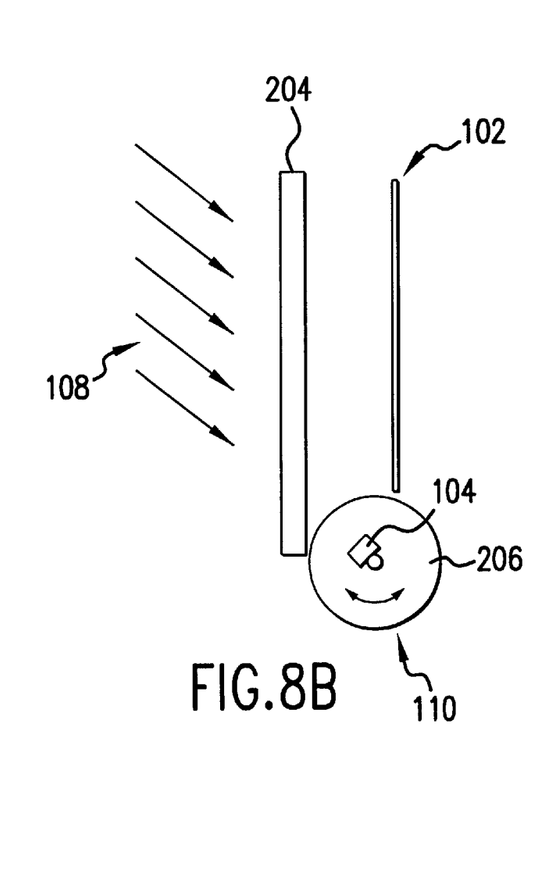

One embodiment of a dimmer 110 is shown in FIGS. 8A and 8B. In this preferred embodiment, dimmer 110 comprises dimmer control 206 constructed as a small wheel which can be adjusted by the user. Light sensor 104 is disposed within wheel dimmer control 206 such that when dimmer control 206 is moved, light sensor 104 is angled towards or away from illumination element 102. When light sensor 104 is angled away from illumination element 102, as shown in FIG. 8B, it detects less light from illumination element 102, thereby causing control system 106 to increase power to illumination element 102, to make increase the intensity of illumination element 102 until the system regulates itself. Conversely, when dimmer control 206 is moved in the other direction, as shown in FIG. 8A, light sensor 104 is angled towards illumination element 102, thereby detecting more light from illumination element 102. Consequently, control system 106 reduces power to illumination element 102 which dims the output. It would be apparent to one skilled in the relevant art from this description that light sensor 104 also moves slightly closer to and away from illumination element 102 when dimmer control 206 is moved. This further increases or decreases the amount of light detected by light sensor 104. It can further be appreciated that if light sensor 104 is moved away from the center of dimmer control 206, turning dimmer control 206 towards or away from illumination element 102 has a greater effect on the distance that light sensor 104 moves towards or away from illumination element 102.

Figure 9A:
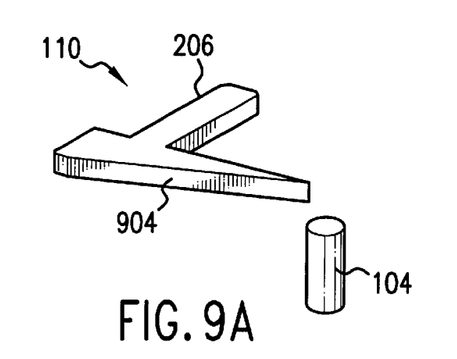
FIGS. 9A–9C are isometric views of an alternative embodiment of a dimmer of the present invention.
Figure 9B:
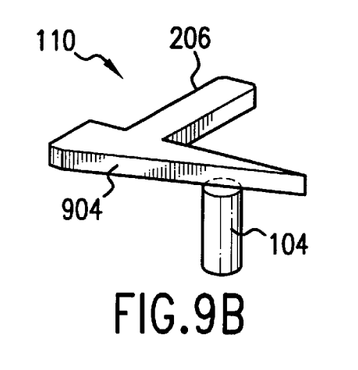
Figure 9C:
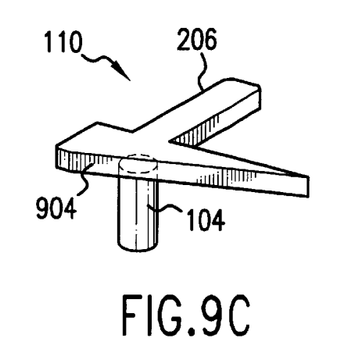

Another embodiment of dimmer 110 is shown in FIGS. 9A–9C. In this embodiment, dimmer 110 comprises dimmer control 206 and a mechanical dimmer element constructed as a sloped section 904. Dimmer control 206 allows the user to slide sloped section 904 such that light sensor is progressively unblocked (FIG. 9A), partially blocked (FIG. 9B), or completely blocked (FIG. 9C). The amount of sloped section 904 blocking light sensor 104 adjusts the quantity of light detected by light sensor 104. Therefore, if dimmer control 206 is moved such that sloped section 904 completely blocks light sensor 104, light sensor 104 detects no light from illumination element 102, thereby causing control system 106 to increase power to illumination element 102. Similarly, as dimmer control 206 is moved such that sloped section 904 begins to uncover light sensor 104, light sensor 104 detects more light from illumination element 102. This causes control system 106 to decrease power to illumination element 102, thereby decreasing the intensity of light emitted from illumination element 102.

Figure 10A:
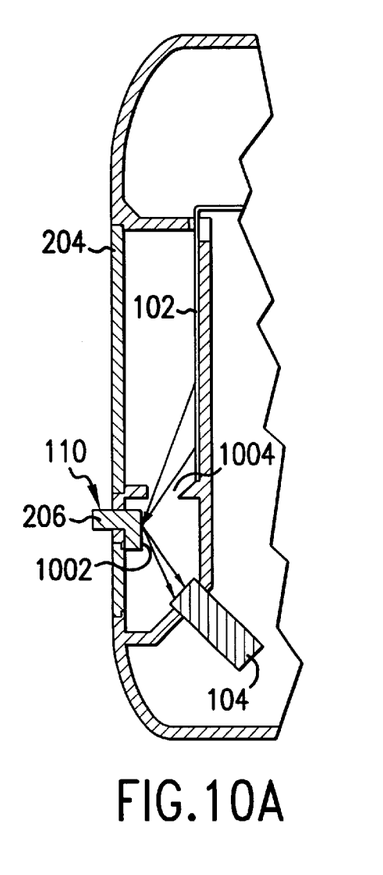
FIGS. 10A and 10B are a second alternative embodiment of a dimmer of the present invention.
Figure 10B:
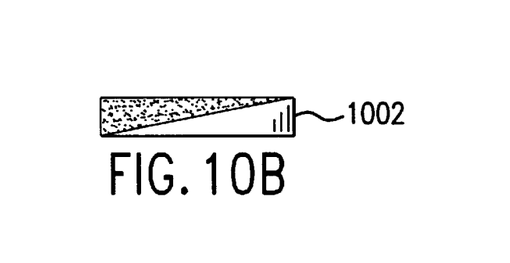

FIGS. 10A and 10B show another alternative embodiment of dimmer 110. In this embodiment, dimmer 110 comprise a dimmer control 206 and a partially mirrored reflective section 1002. Reflective section 1002 has a sloped reflective surface across its face. Dimmer control 206 allows the user to slide reflective section 1002 such that light emitted from illumination element 102 is variably reflected as a function of the amount of reflective material on the part of reflective section 1002 which is positioned so as to conduct light to light sensor 104 via aperture 1004. The sliding position of dimmer control 206 therefore adjusts the quantity of light detected by light sensor 104. As described above, if dimmer control 206 is moved such that reflective section 1002 reflects effectively no illumination from illumination element 102, light sensor 104 detects no light from illumination element 102, thereby causing control system 106 to increase power to illumination element 102. Similarly, as dimmer control 206 is moved such that reflective section 1002 reflects a greater amount of light from illumination element 102, light sensor 104 detects more light from illumination element 102. This causes control system 106 to decrease power to illumination element 102, thereby decreasing the intensity of light emitted from illumination element 102.

Several other possible embodiments of dimmer 110 exist. For example, dimmer control 206 could be coupled to illumination element 102 such that moving dimmer control 206 moves illumination element 102 towards or away from light sensor 104. This has the same effect as moving light sensor 104 towards or away from illumination element 102, as described above with respect to FIGS. 8A and 8B. Similarly, an adjustable reflecting device could be positioned between illumination source 102 and light sensor 104. Dimmer control 206 adjusts the angle or position of the reflecting device such that light sensor 104 detects more or less light from illumination element 102. Several other similar devices could be designed that increase or decrease the amount of light detected by light sensor 104 from illumination element 102.

Note that dimmer 110 can be designed to completely shut off light from illumination source 102 to light detector 104, as discussed above. This would allow maximum light output from illumination source 102, and also provides for the greatest amount of variability in output power (i.e., from 0% to 100%). It is also possible to design dimmer 110 such that it cannot completely prevent light from illumination source 102 from reaching light detector 104. In this embodiment, the system could not produce maximum output of the illumination source, however, it could provide automatic decay adjustment over a longer period of the illumination element's life span. For example, the system could be designed such that when dimmer 110 is adjusted for maximum output, control system 106 would only provide 30% of its maximum power supplying capability to illumination element 102. Although the maximum light output of such a system is initially less than if 100% of the power supplying capability were utilized, as illumination element 102 ages, the remaining 70% of control system's 106 power supplying capability would steadily come into effect. This would allow illumination element 102 to keep is artificial "maximum" output for a longer period of time.

Figure 11:
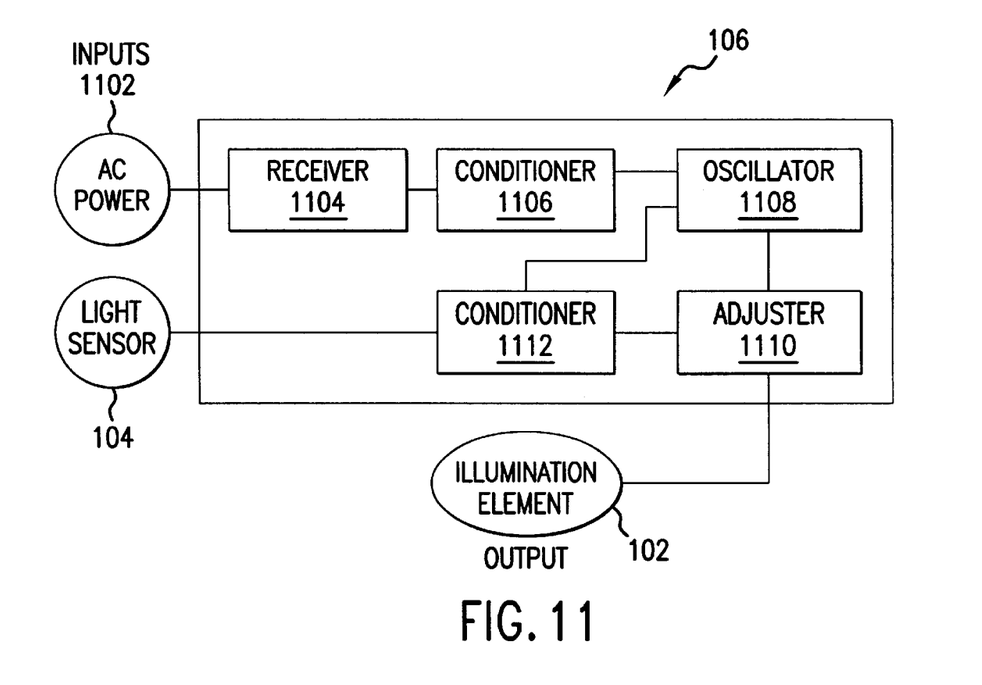
FIG. 11 is a block diagram of an embodiment of the control system of the present invention.

An exemplary embodiment of control system 106 is shown in block diagram form in FIG. 11. As would be apparent to one of ordinary skill in the relevant art, this is only a particular embodiment of control system 106. Several other designs could be utilized to achieve the same or similar result. Control system 106 receives input from AC power source 1102 and from light sensor 104. AC power is then treated through a rectifier 1104 and a power conditioner 1106. Rectifier 1104 can be a full wave rectifier, a half wave rectifier, a voltage doubler, or several other common design alternatives. Power conditioner 1106 can be comprised of capacitors, or resistors and capacitors, or inductors and capacitors, or various other common implementations. The purpose of power conditioner 1106 is to provide some amount of stabilization for the rectified power source. An oscillator 1108 receives the rectified and conditioned A/C power. Oscillator 1108 can generate a sinusoidal wave via an RC shift network, a Wien bridge, or an inductor-capacitor arrangement. Alternatively, oscillator 1108 can could generate a modified square wave or a composite wave-form via flip-flops, or an astable network, or via a free-running multi-vibrator, or via several other common circuit implementations, as would be apparent to one of ordinary skill in the relevant art. Oscillator 1108 could also use crystal or ceramic oscillators, or even the output of a microprocessor. Oscillator 1108 can be designed as either a fixed- or variable-controlled oscillator. If the design is a variable-controlled oscillator, then the conditioned signal from light sensor 104 can vary the rate of oscillation as a function of the amount of light sensed, and thus it would affect the intensity of the EL element.

The output of the oscillator 1108 is then sent to a power adjuster 1110 which conditions the output so that it is within the operating norms of illumination element 102. The resulting power is then output from control system 106 and applied to the contacts of the EL lighting element, producing an appropriate glow. Power adjuster 1110 can be either a fixed- or variable-controlled regulator design, configured so as to adjust either the voltage or the current (or both). If the design is a variable-controlled regulator, then the conditioned signal from light sensor 104 varies the amount of power output during each oscillation as a function of the amount of light sensed, and thus it would affect the intensity of illumination element 102.

The second input into control system 106 is from light sensor 104. The input from light sensor 104 is conditioned by conditioner 1112 to adjust it to the needs of the other circuitry in control system 106. The output from conditioner 1112 is then applied as a controlling signal for either oscillator 1108 or power adjuster 1110, or both. Thus, the signal from light sensor 104 affects the intensity of illumination element 102.

As the intensity of illumination element 102 varies, the changed intensity from illumination element 102 is detected by light sensor 104 transferred to control system 106, as described above. This allows for constant adjustment of the intensity of illumination element 102 to a desired setting, even when illumination element 102 begins to fade. As fading begins to occur, light sensor 104 will detect less light from illumination element 102, and power adjuster 1110 or oscillator 1108 of control system 106 will thereby increase the intensity of illumination element 102 until it reaches the intensity pre-set by the user using dimmer control 206. Similarly, as dimmer control 206 is adjusted, light sensor 104 detects less or more light from illumination element 102. Control system 106 automatically adjusts for this change, and power adjuster 1110 provides more or less power to illumination element 102. This allows for user control of the intensity of illumination element 102 simply by adjusting dimmer control 206.

In addition, when light sensor 104 is designed to detect ambient light 108 from the area surrounding device 100, an increase in ambient light 108 will cause control system 106 to decrease the intensity of illumination element 102. Therefore, control system 106 can be designed such that the amount of ambient light 108 detected by light sensor 104 will be sufficient to completely shut off illumination element 102 in daylight type conditions. This provides a "daytime off" feature which extends the serviceable life of illumination element 102. Similarly, light sensor 104 can be designed such that it receives both ambient light and light emitted from illumination element 102. Control system 106 can be designed such that the amount of ambient light 108 detected by light sensor 104 exceeds the amount of light detected from illumination element 102. Further, dimmer 110 can be designed to affect only that amount of light detected by light sensor 104 which is emitted by illumination element 102. This combination of design element allows the anti-ageing feature, the daytime-off feature, and the adjustable dimmer feature to be efficiently incorporated into a supplementary lighting device.

While the invention has been particularly shown and described with reference to preferred embodiments thereof, it will be understood by those skilled in the art that various changes in form and details may be made therein without departing from the spirit and scope of the invention.

What is claimed is:

1. A supplementary lighting device comprising:
   an electroluminescent lighting element having a light intensity;
   a control system coupled to said electroluminescent lighting element, wherein said control system varies the light intensity of said electroluminescent lighting element;
   a user-adjustable dimmer coupled to said control system, wherein said dimmer includes a dimmer control and user adjustment of said dimmer control causes said control system to vary the light intensity of said electroluminescent lighting element;
   electrical connection blades, wherein the supplementary lighting device is coupled to a standard alternating current outlet through said electrical connection blades; and
   a light sensor coupled to said control system and disposed in the device so as to detect light emitted from said electroluminescent lighting element, wherein said control system varies the light intensity of said electroluminescent element so that said control system receives an input from said light sensor which effectively matches a pre-set level.
   wherein said user-adjustable dimmer includes a mechanical dimmer element positioned to optically and/or mechanically adjust the amount of light which is detected by said light sensor from said electroluminescent lighting element.

2. The supplementary lighting device of claim 1, wherein said mechanical dimmer element comprises a shutter which progressively blocks or unblocks light emitted from said electroluminescent lighting element from being detected by said light sensor according to the adjustment of said dimmer control.

3. The supplementary lighting device of claim 1, wherein said mechanical dimmer element comprises a reflector which progressively reflects more or less light emitted from said electroluminescent lighting element onto said light sensor, according to the adjustment of said dimmer control.

4. The supplementary lighting device of claim 1, wherein said mechanical dimmer element comprises a lens which progressively focuses more or less light emitted from said electroluminescent lighting element onto said light sensor, according to the adjustment of said dimmer control.

5. The supplementary lighting device of claim 1, wherein said mechanical dimmer element comprises a light-pipe which progressively directs more or less light emitted from said electroluminescent lighting element onto said light sensor according to the adjustment of said dimmer control.

6. The supplementary lighting device of claim 1, wherein said mechanical dimmer element couples said dimmer control to said electroluminescent lighting element and user adjustment of said dimmer control moves at least a portion of said electroluminescent lighting element towards or away from said light sensor.

7. The supplementary lighting device of claim 1, wherein said mechanical dimmer elelment couples said dimmer control to said light sensor and user adjustment of said dimmer control moves at least a portion of said light sensor towards or away from said electroluminescent lighting element.

8. The supplementary lighting device of claim 1, wherein said mechanical dimmer element couples said dimmer control to said light sensor and user adjustment of said dimmer control varies the angle of said light sensor such that said light sensor detects more or less light emitted from said electroluminescent light element.

9. The supplementary lighting device of claim 1, wherein said mechanical dimmer element couples said dimmer control to said electroluminescent lighting element and user adjustment of said dimmer control varies the angle of at least some portion of said electroluminescent lighting element such that said light sensor detects more or less light emitted from said electroluminescent lighting element.

10. The supplementary lighting device of claim 1, wherein said light sensor also detects ambient light around the device and said control system reduces or eliminates the light intensity of said electroluminescent lighting element when the input received from said light sensor effectively reaches a pre-set level.

11. The supplementary light device of claim 1, further comprising a second light sensor coupled to said control system which detects ambient light around the device and said control system reduces or eliminates the light intensity of said electroluminescent lighting element when the input received from said second light sensor reaches a pre-set level.

12. A supplementary lighting device comprising:
    a housing;
    a user replaceable electroluminescent lighting element disposed within said housing;
    a control system disposed within said housing and coupled to said electro luminescent lighting element, wherein said control system varies the light intensity of said electroluminescent lighting element;
    a guide-way disposed within said housing, wherein said guide-way aligns and guides said user replaceable electroluminescent lighting element into mechanical and electrical contact with said control system; and
    a window coupled to said housing by a fastener, wherein said electroluminescent lighting element is disposed behind said window and said fastener cannot be uncoupled without first removing the device from a power source.

13. A supplementary lighting device comprising:
    a housing;
    electrical connection blades projecting from a rear surface of said housing; and
    a protector surrounding said electrical connection blades, said protector retracting as said electrical connection blades are inserted into an electrical outlet and extendidng to surround said electrical connection blades as said electrical connection blades are removed from the electrical outlet.

14. The supplementary lighting device of claim 13, wherein said protector is formed as collapsible bellows.

15. The supplementary lighting device of claim 14, further comprising a cavity in said rear surface of said housing, wherein said protector collapses into said cavity as said electrical connection blades are inserted into the electrical outlet.

* * * * *